Aug. 29, 1950     H. W. PRICE     2,520,734
TRANSMISSION OPERATING MEANS

Filed Dec. 31, 1943     5 Sheets-Sheet 1

INVENTOR.
HAROLD W. PRICE
BY H. O. Clayton

Aug. 29, 1950     H. W. PRICE     2,520,734
TRANSMISSION OPERATING MEANS

Filed Dec. 31, 1943     5 Sheets-Sheet 4

INVENTOR
HAROLD W. PRICE
BY H. O. Clayton

INVENTOR.
HAROLD W. PRICE
BY H. O. Clayton

Patented Aug. 29, 1950

2,520,734

UNITED STATES PATENT OFFICE 2,520,734

TRANSMISSION OPERATING MEANS

Harold W. Price, South Bend, Ind., assignor to Bendix Aviation Corporation, South Bend, Ind., a corporation of Delaware Application December 31, 1943, Serial No. 516,391

3 Claims. (Cl. 74—335)

This invention relates in general to power means for operating a change-speed transmission and particularly to a pressure differential operated power means suitable for operating the multi-speed transmission of an automotive vehicle said vehicle being anyone of a military tank, a truck or a bus.

The principal object of my invention is to provide a simple and compact system of links, levers and other force transmitting means for interconnecting anyone of the several shift rails of a multi-speed transmission, a manually operated shift lever and a double-acting pressure differential operated motor said motor being controlled by a two part follow-up valve.

It is a further object of my invention to so construct and arrange the parts of said force transmitting means that the driver of the vehicle, whether it be a tank, a truck, or a bus is conscious, during the operation of the transmission of said vehicle, of the degree of transmission operating force being exerted by the power element of the motor. This feature of the power means constituting my invention is known to those skilled in the art as feel.

A further object of my invention is to provide a system of links, levers, and other force transmitting means interconnecting the power element of a double-acting pressure differential operated motor, the two parts of a follow-up valve for controlling the operation of said motor, a manually operated shift lever and anyone of a plurality of transmission shift rails movable in either one or the other of two directions, said system including a lever member which is first selectively moved about one pivot into engagement with one of the shift rails and is then, when acting as a lever of the second class, moved about another pivot to effect a movement of the selected rail to establish the transmission in the desired gear ratio setting.

Yet another object of my invention is to provide a simple and compact nest of levers mounted immediately adjacent the transmission operating pressure differential operated motor of my invention said levers serving when operated to open, close and lap a follow-up valve within said motor and further serving to effect a reacting force opposing the operation of a shift lever actuated by the driver said reacting force or so-called feel being directly proportional to the transmission operating force exerted by the power element of said motor.

Other objects and advantages of the invention will be readily apparent to those skilled in the art from the following description taken in connection with the accompanying drawing which represents a preferred embodiment. After considering this embodiment skilled persons will understand that many variations may be made without departing from the principles disclosed; and I contemplate the employment of any structures, arrangements or modes of operation that are properly within the scope of the appended claims.

Figure 1:
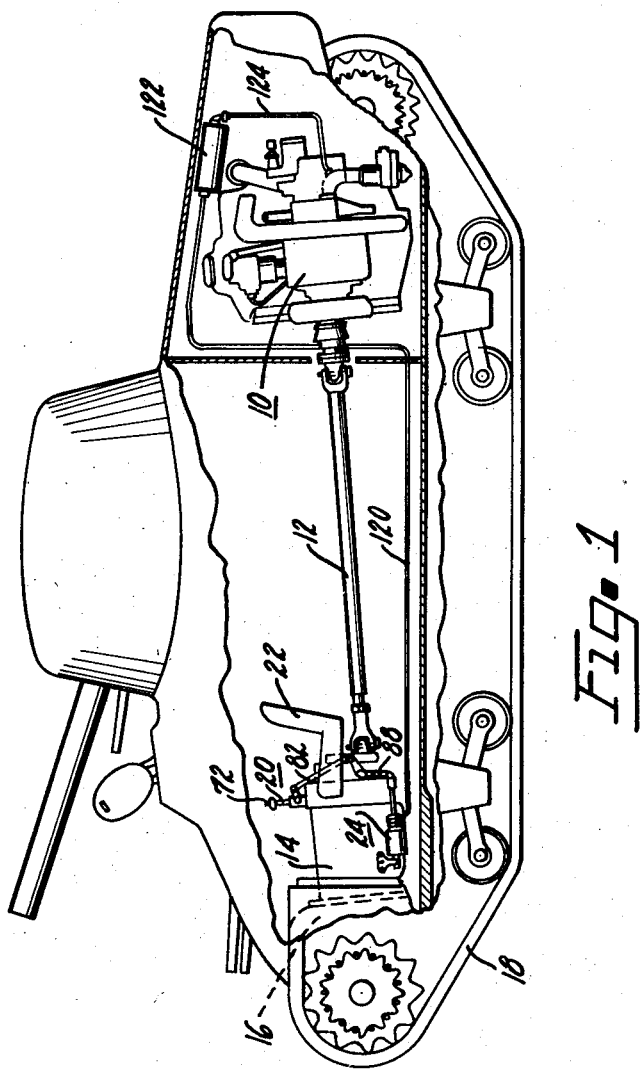
Figure 1 is a diagrammatic view of a military tank said view being broken away to disclose parts of the power plant including the transmission operating means constituting my invention.

In Figure 1 there is disclosed a part of the transmission operating mechanism of my invention said mechanism constituting a portion of the power plant of a military tank. It is to be understood however that my transmission operating mechanism may be used to operate the transmission of an automotive vehicle such as a truck or bus, said transmission having a plurality of shift rails projecting from the casing of the transmission.

Referring now to Figure 1 there is disclosed in this figure a tank including in its power plant an internal combustion engine 10 which is connected, by means of a drive shaft 12, with a multi-speed transmission 14. This transmission is drivably connected to the so-called final drive 16 of the tank which serves to drive a track 18 to propel the tank over the ground.

The transmission operating mechanism constituting my invention is disclosed in detail in Figure 2 and includes as major parts a manually operated shift lever 20 mounted adjacent the driver's seat 22, a double-acting pressure differential operated motor 24 secured to the casing of the multi-speed transmission 14 and the hereinafter described force transmitting means interconnecting any one of reciprocable shift rails 26, 28 and 30 of the transmission with said shift lever motor. These three shift rails, each of which are moved to one or the other of two positions to establish the transmission in gear, project from the casing of the transmission. However my invention is not limited to means for operating just three shift rails; for an inspection of Figure 2 and a reading of the description of the invention to follow makes it obvious that the transmission operating mechanism of my invention may be employed to operate a transmission comprising two or more shift rails projecting from the transmission casing.

Figure 4:
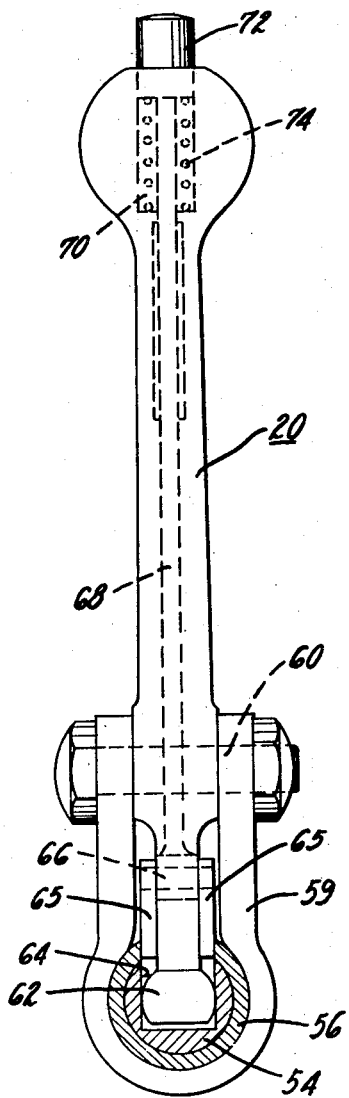
Figures 4 and 5 are views disclosing the details of the manually operated shift lever of my invention.
Figure 5:
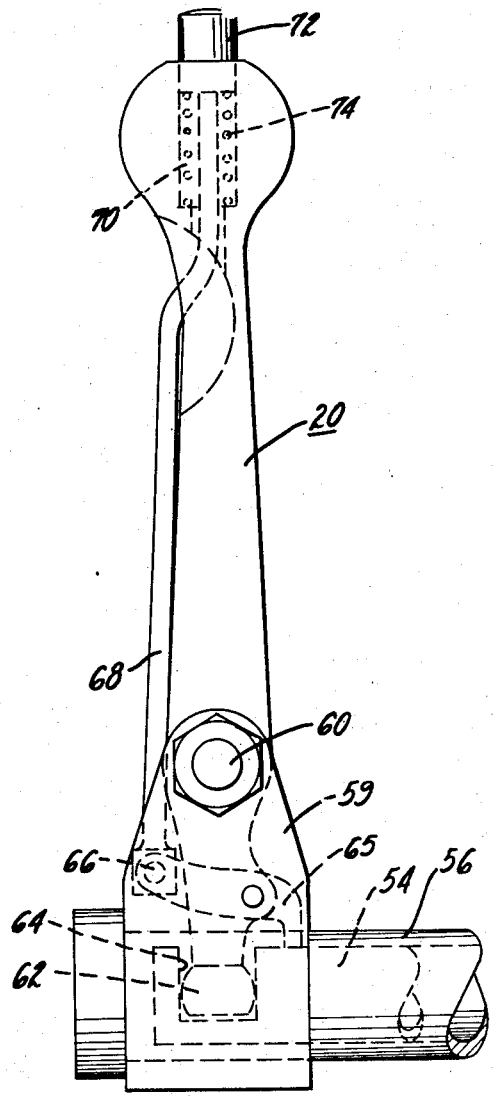

Describing now in detail the aforementioned force transmitting means interconnecting the shift lever, motor and shift rail to be actuated, one of the principal parts of said means is a lever 32 operable both to select a shift rail to be actuated and to actuate said lever to establish the transmission in gear. This lever 32 is preferably pivotally connected, at its forked lower end 34, to a U-shaped lever operating member 36 the ends of which are rotatably mounted upon a shaft 38. One end of this shaft is preferably mounted in the casing of a portion of the drive shaft 12 and the other end of said shaft is supported by a hangar 40 which is preferably secured to the casing of the transmission. The lever 32 is enlarged at 42 to provide a boss which fits within a slot in a bodily movable shaft 44 extending parallel or substantially parallel to the shaft 38; and an opening 45 in said lever, through which the shaft 38 extends, is elongated to make it possible to move the lever laterally about said shaft. To one end of the shaft 44 there is pivotally connected the lower end of a lever 46 which is pivotally mounted at 48 to an arm 50 extending from a portion of the transmission casing. The upper end of the lever 46 is pivotally connected at 52 to one end of shaft 54 slidably mounted within a tubular shaft 56 which is rotatably supported by standards 58 extending from the transmission casing. As disclosed in Figures 4 and 5 the means for rotating the shaft 54 and bodily moving the same within the tubular shaft 56 comprises the aforementioned shift lever 20 and the means disclosed in said figures for connecting said lever with said shafts. This connecting means includes a U-shaped strap 59 wrapped around the shaft 56 and pivotally connected to the lever 20 by a pin 60. The enlarged lower end portion 62 of the shift lever 20 fits within a notch 64 in the end of the shaft 54. A pawl member 65, of two parts straddling the lower end portion of the shift lever, is pivotally connected by a pin 66 to a thrust link 68 extending along the side of the shift lever and through a recess 70 in said lever at its upper end. A button member 72 at the upper end of the link 68 fits within the recess 70 and a return spring 74, housed within said recess and surrounding the link, serves to bias the link upwardly. The lower end portions of the two-part pawl 65 fit within a slot in the shaft 56.

It will be apparent from the above description that depression of the button 72 serves to effect a movement of the lower ends of the pawl out of the slot in the shaft 56 whereupon a lateral movement of the shift lever about the pivot pin 60 serves to effect a lateral movement of the shaft 54 in one direction or the other depending upon the direction of movement of the shift lever; and rotation of the shift lever forwardly or backwardly, when the pawl 65 is in its engaged position, results in a rotation of the tubular shaft 56. The lateral or cross shift movement of the shift lever results in the angular movement of the lever 46 about the pivot 48 thereby bodily moving the shaft 44. This operation results in the angular movement of the lever 32 the upper end 76 of which moves into engagement with the notched end of one or the other of shift rails 26 or 28 projecting from the casing of the transmission; and when rotated clockwise the body of the lever 32 nests within the notched end of the shift rail 30.

Describing now that portion of the force transmitting means interconnecting the shift lever 20, the power element 78 of the motor 24, the two parts of the hereinafter described follow-up control valve within said motor and the lever operating member 36, said force transmitting means includes a crank 80 secured to the tubular shaft 56 said crank being pivotally connected at its end to the upper end of a link 82. This link is pivotally connected at its lower end to one arm of the bell crank lever 84 pivotally mounted on the end of the shaft 38. As disclosed in Figures 2 and 3 the lower arm of said bell crank lever is adjustably connected by a bolt 86 to a valve operating member 88 having projections 90 and 92 at its lower end. To the end of the projection 90 there is pivotally connected a rod 94 which extends through a tubular two-diametered member 96. The end portion 97 of said tubular member 96, which may be fixedly connected to the hub of the piston 78 by the locking rings 91 disclosed in Figures 6 to 8, inclusive, is ported at 98 and 100 and constitutes one of the two parts of the follow-up valve for controlling the operation of said motor. Positioned alongside the valve operating member 88 is a power lever 102 which is pivotally connected by a pin 104 to a boss 106 extending laterally from and preferably constituting an integral part of the lever operating member 36. The upper end of the power lever 102 is provided with an elongated slot 108 receiving a pin 110 extending laterally from and fixedly secured to one end of the lower arm of the bell crank lever 84. The lower end of the power lever 102 is shaped to provide a clevis member 112 which is pivotally connected to the clevised end portion of the aforementioned two diameter tubular member 96.

Figure 6:
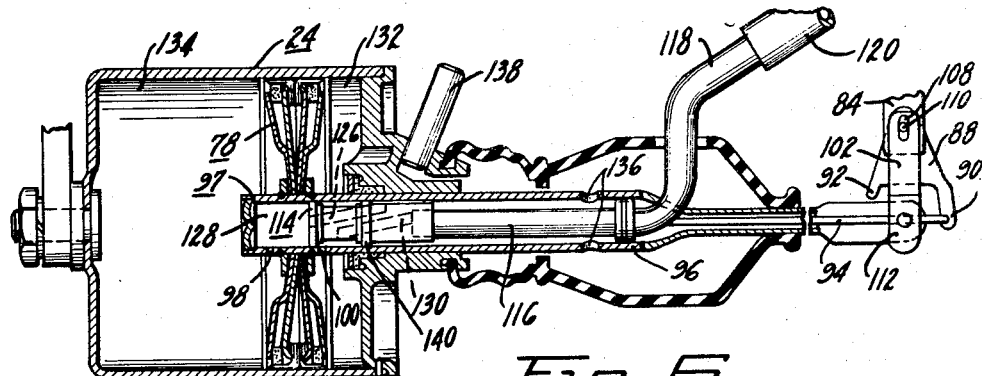
Figure 6 is a sectional view of the pressure differential operated motor and valve unit of my invention the parts being in position to establish the transmission in one of its settings.
Figure 7:
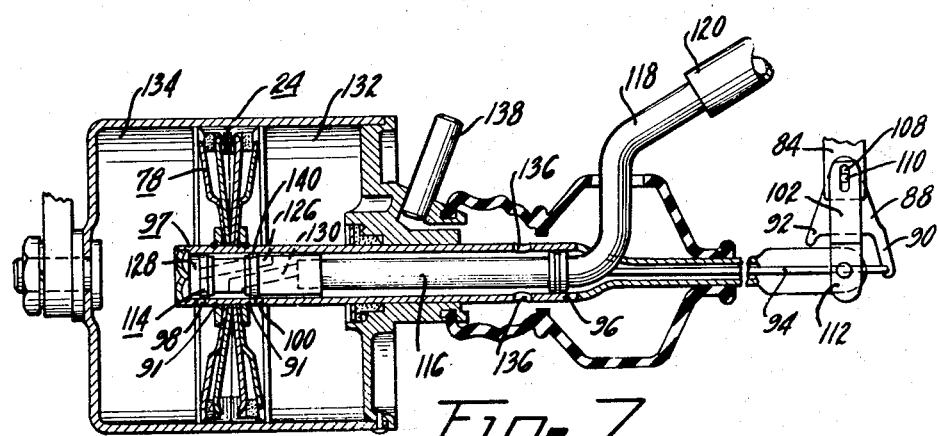
Figure 7 is a view similar to Figure 6 the piston of the motor and valve parts being in their transmission neutral position.
Figure 8:
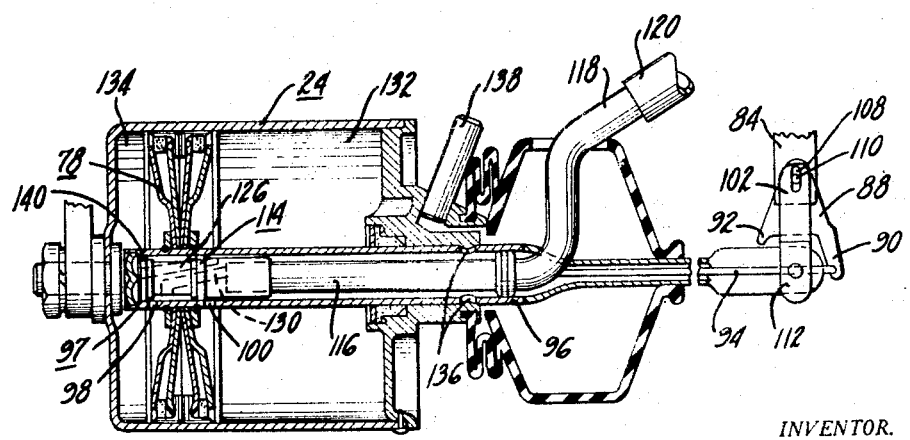
Figure 8 is a view similar to Figure 6 the piston and valve parts being in position to establish the transmission in one of its settings.

The transmission operating double-acting air suspended motor 24 and its follow-up control valve mounted therein are disclosed in detail in Figures 6, 7 and 8. Referring now to these figures there is housed within the aforementioned valve member 97 a spool shaped valve member 114 secured to one end of a tubular member 116 to which is fixedly secured one end of the aforementioned valve operating rod 94. The end of the member 116 is bent outwardly to provide a nipple 118 to which is secured a conduit 120 preferably connected to a vacuum tank 122, Figure 1. This tank is connected by a conduit 124 to the intake manifold of the internal combustion engine 10 of the vehicle said manifold constituting a source of vacuum.

Describing in greater detail the construction of the two-part follow-up valve 97, 114, the part 114 of said valve is bored to provide a diagonally extending duct 126 extending through said valve part and interconnecting a chamber 128 and the space between the tubular members 116 and 96. The valve part 114 is also bored to provide a diagonally extending duct 130 interconnecting the interior of the tubular member 116 and a chamber outlined by the small diametered portion of said valve part and a portion of the valve part 97.

Figure 2:
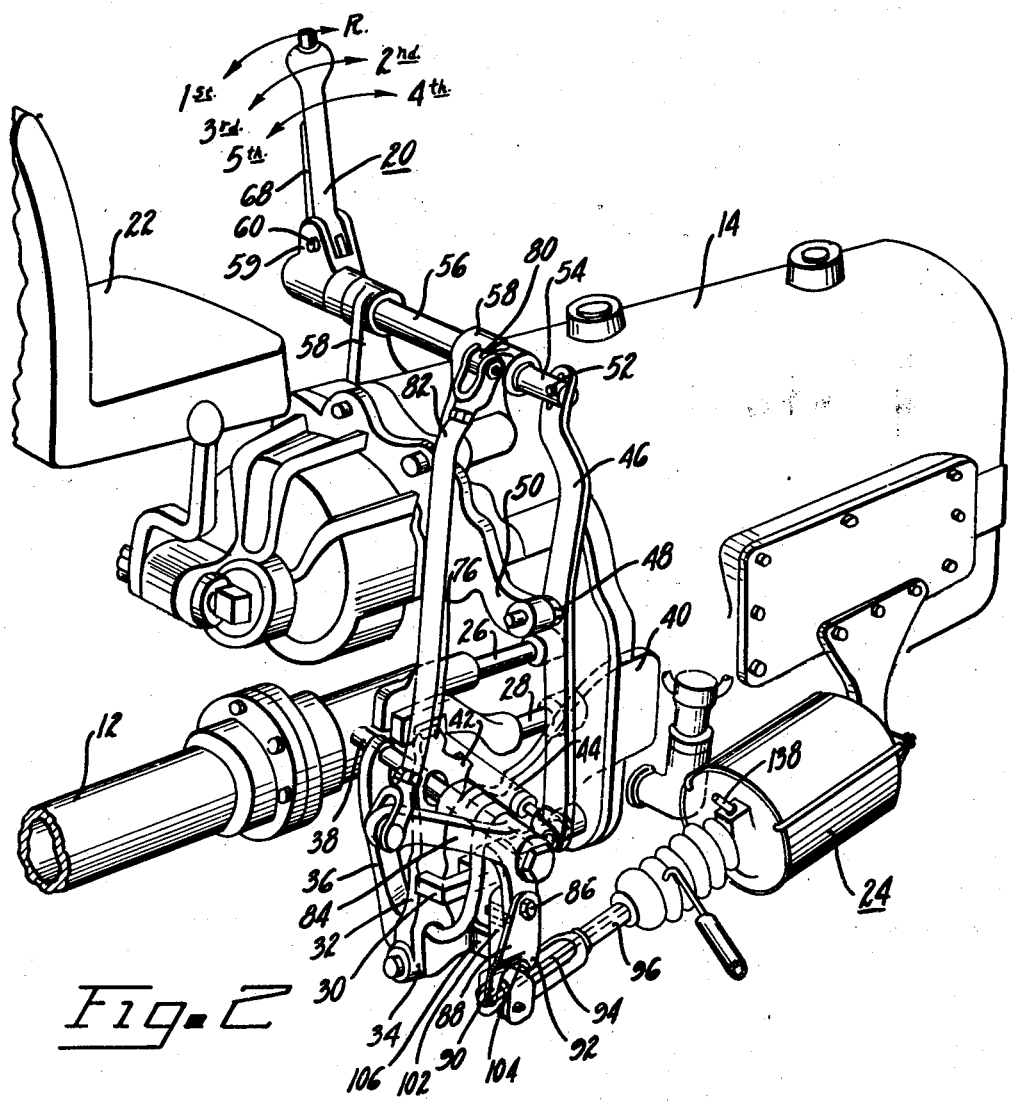
Figure 2 is a diagrammatic view disclosing in perspective the transmission operating means constituting my invention.

Describing now the operation of the above disclosed transmission operating mechanism constituting my invention when the driver wishes to establish the transmission in say its first gear setting he first depresses the button 72 and then moves the shift lever 20 laterally to the left, Figure 2; and this operation serves to rotate the lever 46 clockwise to bodily move the shaft 44 to the left, Figure 2. The lever 32, which is connected to the shaft 44 by the boss 42 is then angularly rotated counterclockwise about its pivot 34 until its upper end meshes within the slot, not shown, in the end of the first and reverse shift rail 26. The driver, having completed the cross shift or rail selecting operation of the shift lever 20, then rotates said lever to the rear toward its first gear position thereby rotating the bell crank lever 84 counterclockwise. Now because of the resistance to movement of the pin 104 caused by the friction of the transmission parts including the shift rail drift lock etc. the power lever 102, which is connected to the lever 84 by the pin 110, will fulcrum about the pin 104 when the bell crank is first moved to open the valve; and this operation of the lever 102 serves to move the valve member 97 connected thereto to the left, Figure 2. The valve member 114 which is connected to the member 88 is moved to the right, Figure 1 with this operation of the valve.

It is apparent therefor that the first increment of the first gear movement of the shift lever 20 serves to open the valve by the movement of the valve parts 97 and 114 in opposite directions; and with this operation the valve parts assume the relative positions disclosed in Figure 6. With this operation of the valve a compartment 132 of the motor 24 is connected to the vacuum tank or other source of vacuum and a compartment 134 of said motor is vented to the atmosphere. Tracing these air transmitting connections the compartment 132 is connected to the tank 122 via the port 100 in the valve member 97, the duct 130, the interior of the member 116, the nipple 118 and the conduit 120; and the compartment 134 is connected to the atmosphere via the port 98 in the valve member 97, the compartment 128 in the valve, the duct 126, the space between the tubular members 96 and 116, ports 136 in the member 96 and a nipple 138 to which may be connected an air cleaner, not shown.

Continuing the description of the operation of the mechanism to establish the transmission in its first gear setting when the valve is opened as just described the piston 78 is subjected to a differential of pressures tending to move the same from its transmission neutral position disclosed in Figure 7, toward the position disclosed in Figure 6. The tubular member 96 is thus moved to the left, Figure 2 to move the lever 102 and thereby rotate the member 36 and the lever 32 counter-clockwise and this operation results in a movement of the shift rail 26 to the left, Figure 2. In this operation it is to be noted that the power lever 102 tends to rotate counter-clockwise thereby placing a load upon the pin 110 which opposes the counter-clockwise rotation of the bell crank lever. This load or force is known in the art as feel for in order to keep the valve open the driver must exert a force upon the upper end of the lever 102 to prevent a clockwise rotation thereof; and this force is directly proportional to the force being exerted by the piston 78 upon the lower end of said lever at its pivotal connection with the end of the member 96.

If the driver should desire to arrest the movement of the shift rail before it has been moved to establish the transmission in its first gear setting he has but to arrest movement of the shift lever. This operation results in a so-called lapping of the valve and an arresting of the movement of the piston 78. Describing the lapped position of the valve parts 97 and 114 the piston 78, after the movement of the valve part 114 is stopped, continues its movement to the right, Figure 6, until the port 100 in the valve part 97 is covered by a land portion 140 of the valve part 114. The withdrawal of air from the compartment 132 is thus stopped and the entire system is placed in equilibrium all movement of the parts in said system being arrested. To continue the first gear movement of the shift rail the driver will then resume the movement of the shift lever toward its first gear position which movement will of course again crack that is open the valve resulting in a resumption of the energization of the motor 24.

Figure 3:
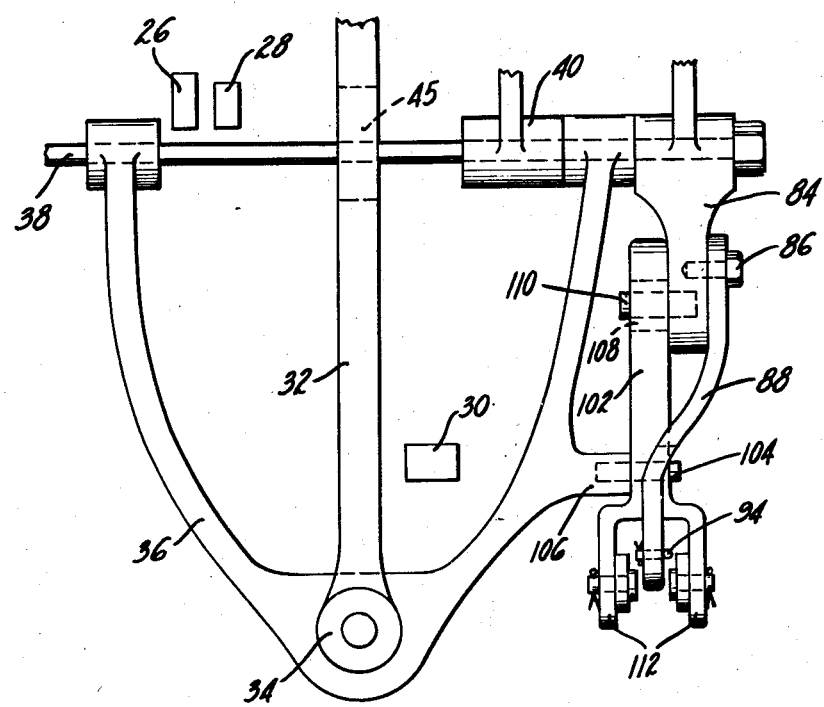
Figure 3 is a view disclosing the principle parts of the force transmitting linkage of my invention.

There is thus provided by the cluster of levers, pins and other force transmitting members disclosed at the right side of Figure 3 means for effecting both a follow-up to lap operation of the valve and the desired feel to advise the driver of the degree of shift rail actuating force being exerted by the piston 78. It is also to be noted that the total force being exerted to move the rail is the sum of the forces exerted by the piston 78 and the driver said force being applied at the lower and upper ends respectively of the power lever 102.

If the power means should fail in its operation then the rail is moved solely by the physical effort of the driver through the intermediary of either of the projections 90 or 92 one or the other of which, after the lost motion in the parts is taken up, contacts the end 112 of the power lever 102.

The shift lever is of course moved until the transmission is established in its first gear setting whereupon the driver will reengage the friction clutch, if the power plant includes such a clutch, and will then speed up the engine to get the vehicle under way. The driver will then, after the desired vehicle speed is reached, establish the transmission in its second gear setting by first moving the shift lever forwardly to neutralize the transmission. He will then move the shift lever laterally to the right to select the second and third shift rail and will then move said lever to its second gear position. The operation of the mechanism to neutralize the transmission or to establish the same in any one of its reverse, second or fourth gear settings will not be described inasmuch as said operations are just the reverse of the above described operation of establishing the transmission in its first gear setting; nor will the operations of establishing the transmission in either of its third or fifth gear settings be described inasmuch as the operation of the mechanism to effect these settings of the transmission, is the same as the above described first gear operation of said mechanism.

There is thus provided, by the transmission operating mechanism of my invention, a very simple, effective and easily serviced means for operating a multi-speed selective gear transmission. That part of the mechanism for selecting the shift rail to be actuated is manually operated and is in large measure independent of the combined power and manually operated mechanism for moving the selected rail to establish the transmission in gear. With the transmission operating mechanism of my invention the driver is at all times conscious of the degree of force being exerted by the motor 24 when the shift rail is being moved; and the driver may, by virtue of the follow-up operation of the valve, feel the transmission into mesh by a step-by-step movement of the shift lever.

It is thought that the invention and many of its attendant advantages will be understood from the foregoing description and though said invention has been illustrated and described in connection with a preferred embodiment it will be apparent that various changes may be made in the form, construction and arrangement of the parts without departing from the spirit and scope of the invention or sacrificing all of its material advantages, the forms hereinbefore described being merely a preferred embodiment.

I claim:

1. Transmission operating means for actuating any one of a plurality of shift rails of a multi-speed transmission including a manually operated shift lever, a double-acting pressure differential operated motor including a power element, a two part follow-up valve for controlling the operation of said motor, means connecting one of the parts of the valve with the power element, and a system of valve and shift rail operating links, levers and other force transmitting means for interconnecting the two parts of the valve and the shift lever, said system including a fixed shaft, a lever support member pivotally mounted on said shaft, a shift rail selecting and shift rail operating lever member pivotally mounted on said support member and having an opening therein through which the shaft extends, the shaft constituting a fulcrum for said lever in one of its operations, a bodily moveable shift rail selecting shaft positioned adjacent the aforementioned shaft, means interconnecting the lever member and second mentioned shaft, valve operated means interconnecting the shift lever and with the lever support member, manually operated means interconnecting the shaft lever and last mentioned means, and manually operated means interconnecting the shift lever and second mentioned shaft.

2. Transmission operating means adapted to actuate any one of a plurality of shift rails of a multi-speed transmission including a manually operated shift lever, a double-acting pressure differential operated motor including a power element, a two part follow-up valve for controlling the operation of said motor, means interconnecting the power element with one of the valve parts, and a system of valve and shift rail operating links, levers and other force transmitting means for interconnecting the two parts of the valve and the shift lever, said system including a fixed shaft, a U-shaped lever support member pivotally mounted at its two ends on said shaft, a shift rail selecting and shift rail operating lever member pivotally mounted on said support member and having an opening therein through which the shaft extends the shaft constituting a fulcrum for said lever in certain of its operations, a bodily movable shift rail selecting shaft positioned adjacent the aforementioned shaft, means interconnecting the lever member and second mentioned shaft, means, including a cluster of valve operating levers mounted immediately adjacent the motor and having one of said levers pivotally connected with the lever support member, manually operated means interconnecting the shift lever and last mentioned means and manually operated means interconnecting the shift lever and second mentioned shaft.

3. Transmission operating means for actuating any one of a plurality of shift rails of a multi-speed transmission including a manually operated shift lever, a double acting pressure differential operated motor including a power element, a two part follow-up valve for controlling the operation of said motor, means interconnecting the power element of the motor with one of the two parts of the valve, and a system of valve and shift rail operating levers, and other force transmitting means interconnecting the two parts of the valve and the shift lever, said system including a floating lever for actuating any one of the shift rails to be operated, a fixed shaft upon which said lever is pivotally mounted, means pivotally mounted on said shaft serving as a mounting for the floating lever and as a part of the means for operating the valve, force transmitting means interconnecting the shift lever and last mentioned means, and means connected with the shift lever and operable to actuate the first mentioned lever to selectively move the same into mesh with any one of the shift rails to be actuated.

HAROLD W. PRICE.

REFERENCES CITED

The following references are of record in the file of this patent:

UNITED STATES PATENTS

| Number | Name | Date |
|---|---|---|
| 1,993,015 | Moorhouse | Mar. 5, 1935 |
| 2,099,422 | Farmer | Nov. 16, 1937 |
| 2,212,955 | Price | Aug. 27, 1940 |
| 2,241,071 | Price | May 6, 1941 |
| 2,251,952 | Price | Aug. 12, 1941 |
| 2,323,878 | Kesling | July 6, 1943 |

Certificate of Correction

Patent No. 2,520,734 August 29, 1950

HAROLD W. PRICE

It is hereby certified that error appears in the printed specification of the above numbered patent requiring correction as follows:

Column 3, line 8, after the word "lever" insert *and*; column 7, lines 50 and 51, strike out "operated means interconnecting the shift lever and" and insert instead *operating means having a part thereof connected*; line 53, for "shaft" read *shift*;

and that the said Letters Patent should be read as corrected above, so that the same may conform to the record of the case in the Patent Office.

Signed and sealed this 6th day of February, A. D. 1951.

[SEAL]

THOMAS F. MURPHY,
*Assistant Commissioner of Patents.*